UNITED STATES PATENT OFFICE.

EDWIN A. HECKER AND CHARLES F. McKHANN, OF NEW MADISON, OHIO.

COMPOSITION FOR SUPPOSITORIES.

SPECIFICATION forming part of Letters Patent No. 327,267, dated September 29, 1885.

Application filed May 15, 1885. (Specimens.)

*To all whom it may concern:*

Be it known that we, EDWIN A. HECKER and CHARLES F. McKHANN, citizens of the United States of America, residing at New Madison, in the county of Darke and State of Ohio, have invented certain new and useful Improvements in Compositions for Forming Suppositories, of which the following is a specification.

Our invention is a medicinal composition of matter, and embraces the following novel features: The ingredients of said composition are combined, according to specific formulas, into the form of slowly-soluble suppositories, in which form they are readily and easily introduced for the purpose of relieving or curing chronic diseases of the uterus, which is hereinafter more fully described, and is specifically set forth in the claim.

Our composition consists of the following ingredients, combined in the proportions stated, viz: Take pulverized acacia, one-half grain; pulverized alum, one and one-half grain; sulphate hydrastia, (berberina,) one-eighth grain, and rose-water enough to mix these and make the mass into an oblong or conical suppository.

The second formula consists of the following ingredients, combined in the proportions stated, viz: Take pulverized acacia, one-half grain; pulverized alum, one and one-half grain, with rose-water enough to mix and make the mass into a suppository, as before.

It is shown in the above formulas that acacia, alum, and water, either of roses or pure, in the form and proportions stated, are the ingredients, in common with the other named—sulphate hydrastia, (berberina)—which latter is used in combination with the others whenever symptomatic diagnosis indicates to a skillful therapeutist the preferable exhibition of either of said remedies.

The exhibition of the above remedial compositions are in the form of suppositories, as described, and are introduced topically in the most convenient manner, where, by their slow solution and continuous action, they prove an exceedingly easy, safe, and salutary self-administrable remedy, and when any other mode of topical treatment would be unsought and possibly refused by the sensitive though suffering patient. Therefore,

What we claim as new, and desire to secure by Letters Patent, is—

The composition of matter consisting of water, either of roses or pure, acacia, and alum, combined with sulphate hydrastia, (berberina,) into the administrable form and in the proportions substantially as and for the purposes herein specified.

In testimony whereof we affix our signatures in presence of two witnesses.

EDWIN A. HECKER.
CHAS. F. McKHANN.

Witnesses:
A. L. NORTHROP,
C. B. NORTHROP.